Figure 1:
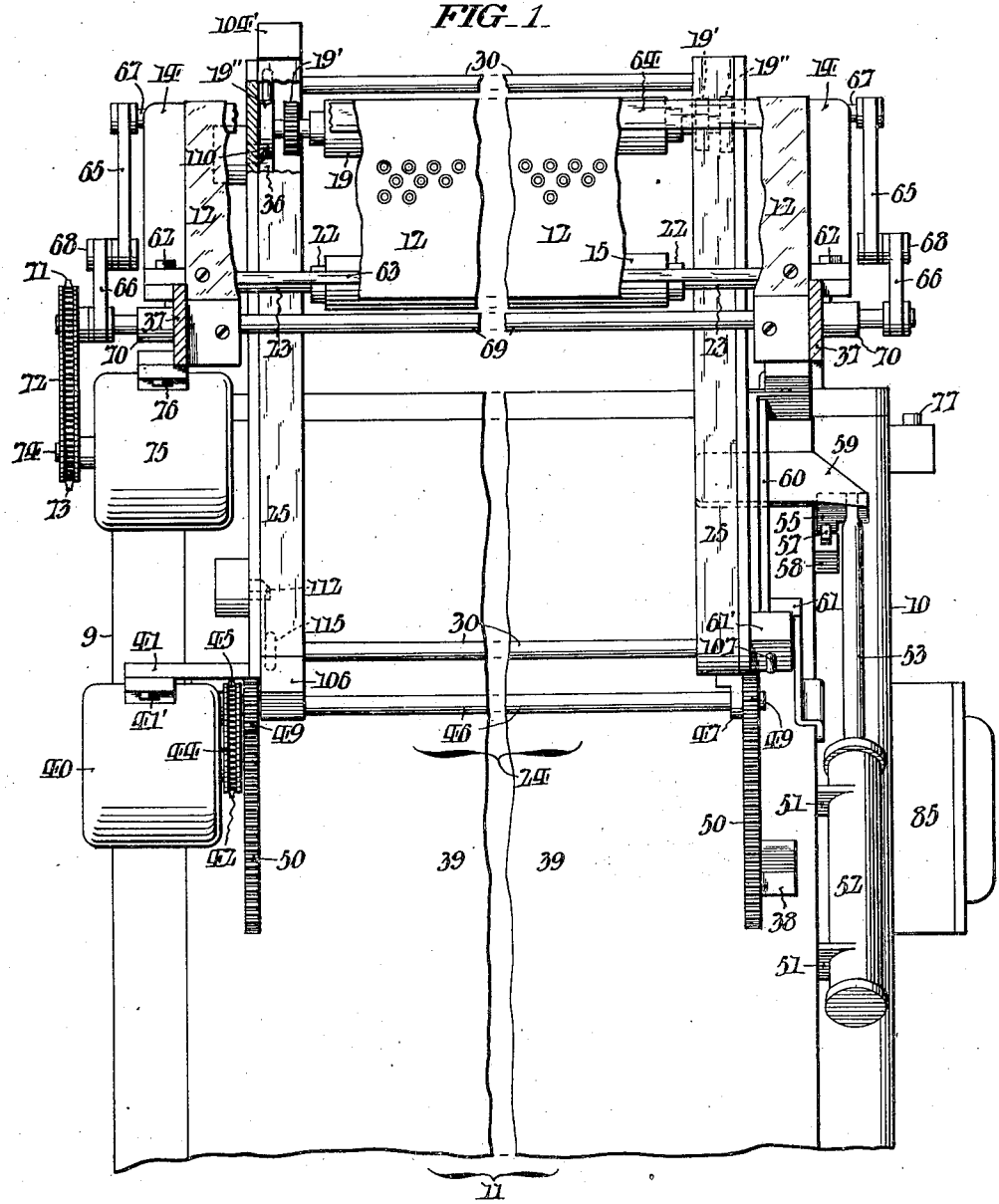

Dec. 13, 1949   J. C. BODANSKY   2,491,439
CONTROLLING DEVICE FOR THE ACCUMULATOR
ROLLS OF BEAM WARPERS
Filed Aug. 25, 1947   5 Sheets-Sheet 2
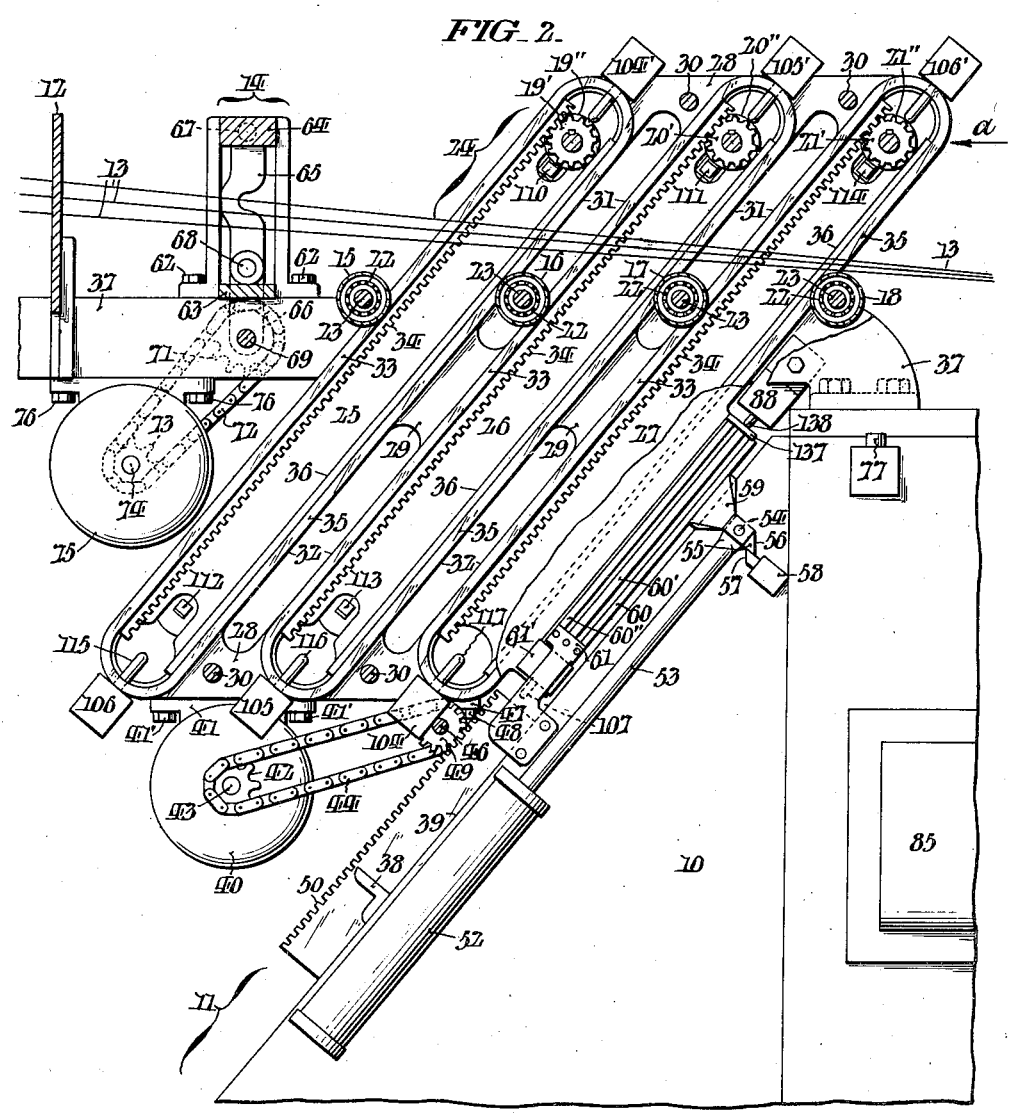
FIG. 2.
FIG. 7.
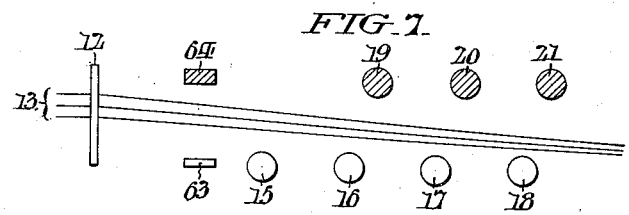
WITNESSES
Thomas W. Kerr, Jr.
A. J. Brittingham
INVENTOR:
John C. Bodansky,
BY Paul & Paul
ATTORNEYS.

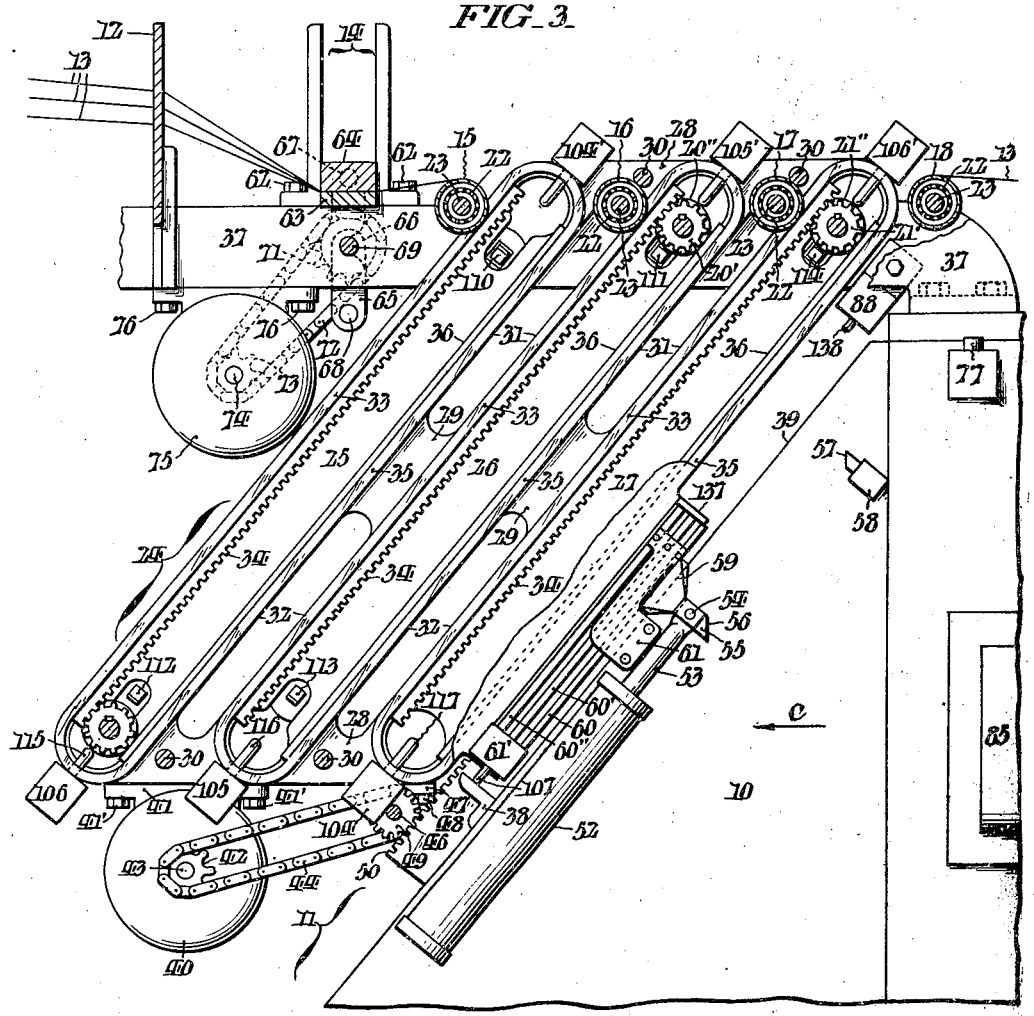

Dec. 13, 1949
J. C. BODANSKY
2,491,439
CONTROLLING DEVICE FOR THE ACCUMULATOR
ROLLS OF BEAM WARPERS
Filed Aug. 25, 1947
5 Sheets-Sheet 4
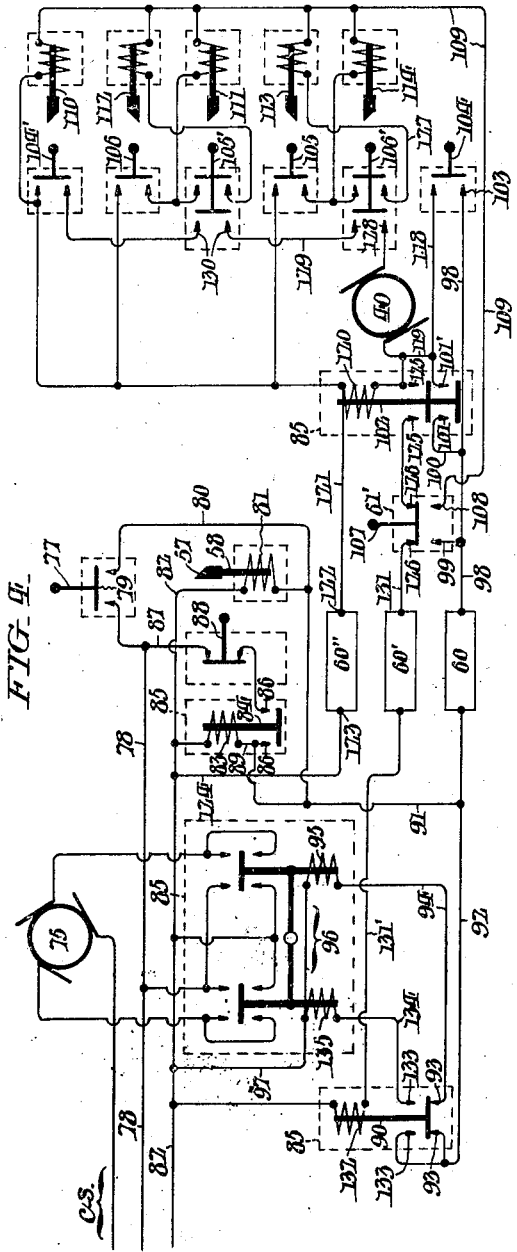
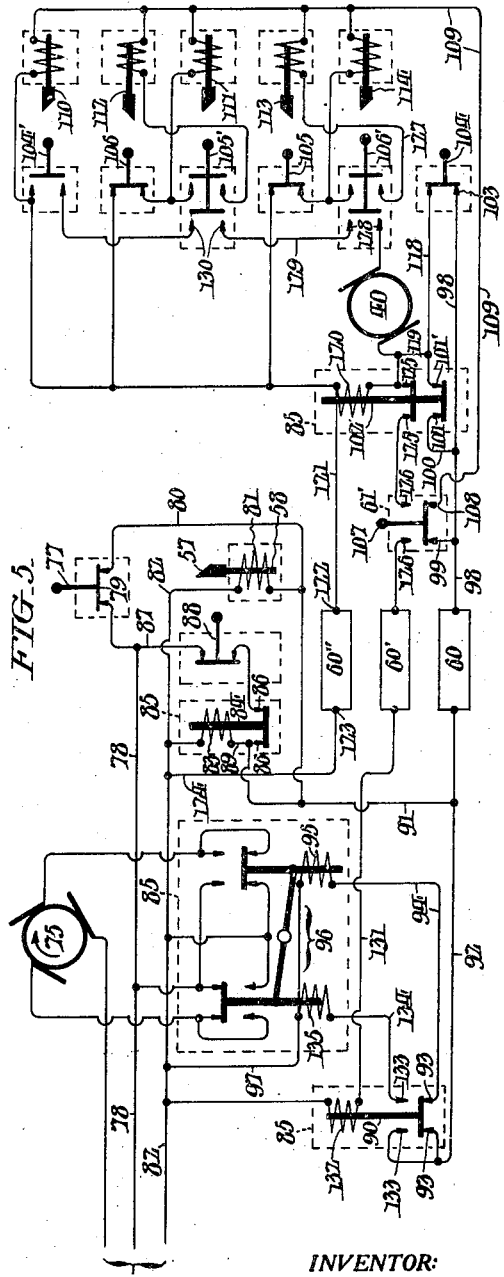
WITNESSES
INVENTOR:
John C. Bodansky,
BY Paul & Paul
ATTORNEYS.

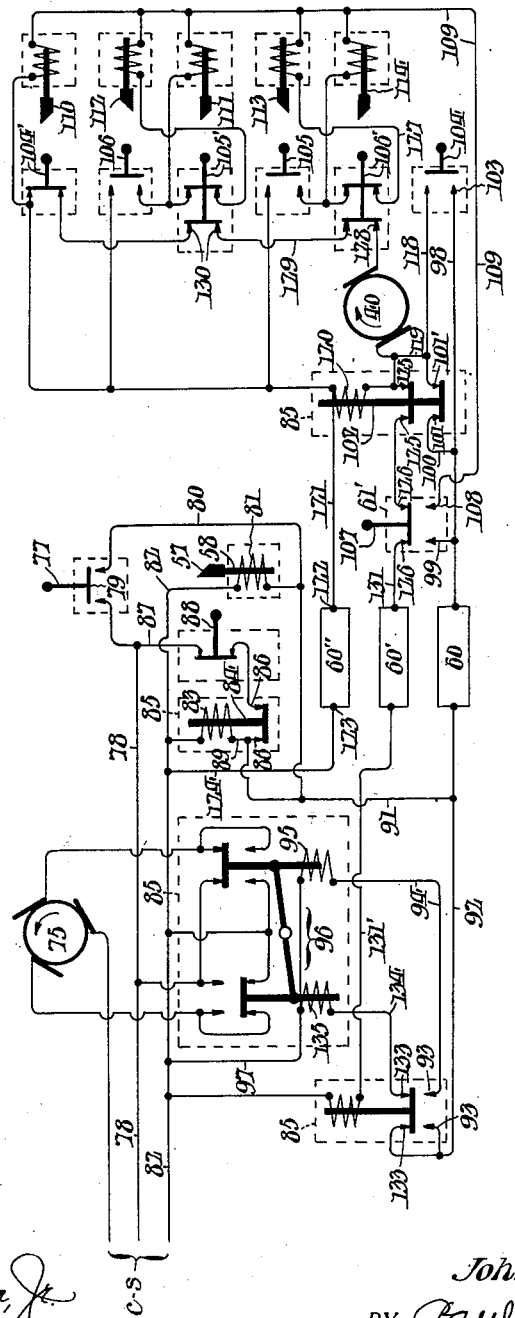

Patented Dec. 13, 1949

2,491,439

UNITED STATES PATENT OFFICE 2,491,439

CONTROLLING DEVICE FOR THE ACCUMULATOR ROLLS OF BEAM WARPERS

John C. Bodansky, Gastonia, N. C., assignor to Cocker Machine and Foundry Company, Gastonia, N. C., a corporation of North Carolina Application August 25, 1947, Serial No. 770,492

9 Claims. (Cl. 28—32)

1

This invention has general reference to controlling devices or means for the accumulator or storage-rolls of machines useful to effect the beaming of multiple yarns or threads from a source of supply in readiness for subsequent weaving or processing; while it relates, more particularly, to the species or form thereof including a carrier affording support for the drop-rolls such as is disclosed in my prior application for a patent filed the 25th day of August, 1947, under Serial No. 770,490.

The primary object of the instant invention is to provide a novel device or means of the type above referred to including refinements whereby the descent and elevation of the consecutively released accumulator drop-rolls, as well as the relatively independent movements of the carrier therefor, are all automatically controlled.

Another object of the present invention is to provide a novel controlling device of the above indicated type further including means effective to cushion and control the progression of the accumulator drop-roll carrier.

A further object of my invention is to provide, in conjunction with the device specified by the two preceding paragraphs, adjunctive controlling means for the yarn or thread clamping mechanism, whereby said mechanism is automatically moved into active position whenever a yarn or thread break occurs and, vice versa, similarly restored to inactivity when the broken yarn or thread has been repaired or knotted.

A still further object of this invention is to provide an improved accumulator-roll assembly for beam warpers including refinements and/or devices which are automatically activated and stopped at the proper time, whereby the efficiency of such warpers is considerably enhanced with a complemental reduction in the operating cost being attained.

Other objects, with ancillary advantages will be evident to those skilled in the art, upon a full understanding of the construction, arrangement, and operation of the typical embodiment of my invention herein disclosed and illustrated; but it is to be expressly understood that other embodiments, or structurally modified forms are contemplated which come equally within the terms and scope of the concluding claims.

In the drawings:

Fig. 1, Sheet 1, is a broken end elevation of a conventional beam warper equipped with the novel controlling means and devices of this invention; said elevation being taken at the yarn or threads supplying end of said warper.

2

Fig. 2, Sheet 2, is a side elevation of the warper having parts broken away and others in section for a clearer showing of otherwise obscured important details, and with the drop-roll carrier elevated.

Fig. 3, Sheet 3, is a similar illustration to the preceding figure, but showing the carrier lowered for effecting withdrawal of the yarn or thread from off the beam.

Fig. 4, Sheet 4, is a diagram of the wiring system for the electrically activated controlling means or devices, with the associated switches in normal position.

Fig. 5 is a similar diagram to the preceding figure, but showing the position of the switches when the accumulator drop-rolls and carrier therefor are down.

Fig. 6, Sheet 5, is a corresponding diagram to the two preceding figures, but showing the position of the switches when the drop rolls and carrier are being elevated.

Fig. 7, Sheet 2, is a diagram illustrating one operating phase of the improved beam-warper embodying the present invention; and Fig. 8, Sheet 3, is a similar diagram of another operating phase, while both of said diagrams are hereinafter fully explained.

In describing the typical embodiment of my invention, shown by the accompanying sheets of illustrative drawings, specific terms will be employed for the sake of clarity, but it is to be understood the scope of said invention is not thereby limited.

Referring more in detail to Figs. 1-3 of the accompanying drawings the reference characters 9, 10 respectively designate the right and left-hand side structures of a conventional beam warper; 11 the forward end thereof; 12 the eye-board through which the yarns or threads 13 are drawn, from any convenient source of supply—not shown, to a clamp device 14; for progression along a plurality of stationarily mounted accumulator rolls 15, 16, 17, and 18, and intervening drop-rolls 19, 20 and 21, see Figs. 7 and 8 to best advantage, to the winding beam—not shown—in accordance with my hereinbefore mentioned prior application; while all of said parts form no direct part of the instant invention, with the exception of the drop rolls 19—21 and carrier therefor.

The stationary accumulator-rolls 15—18 are supported for free rotation through interposed anti-friction bearings 22 on fixed axes 23, in turn mounted across the side structures 9, 10 of the beam warper.

On the other hand the drop-rolls 19—21 are arranged in interveningly-related assembly with capacity for individual gravitation in one direction as well as elevation to normal beaming location and, in addition, are movable upwards and downwards as a unit assemblage by aid of an associated carrier comprehensively designated 24. This carrier 24 may be made-up, or otherwise formed, to include laterally spaced side frames including runways 25—27 conveniently joined at their upper and lower ends by webs 28 and intermediate connector webs 29, as well as being held in spaced parallelism by tie-rods 30, whereby the carriage as a whole is rigidified. At this juncture it is to be particularly remarked, that the runways 25—27, webs 28 and connector webs 29 jointly define intervening upper and lower slots 31, 32 respectively; whereas said runways are of opposingly-related channel cross-section with the forward flanges 33, for example, each embodying or having an attached lengthwise toothed rack 34, while the rear flanges 35 each include a guide rail 36, respectively for purposes hereinafter set forth. It is to be furthermore observed that the axes 23 of the accumulator rolls 16, 17 pass transversely through the upper slots 31 and thereby assist in maintaining the carrier 24 to its proper path of progression; while said carrier 24 is guided intermediate forward extensions 37 from the warper side structures 9, 10; whereas the limit of downward movement of the carrier 24 is limited by stops 38, one only being shown, attached on the inclined forward face 39 of the side structures 9, 10 aforesaid.

Upward movement of the carrier 24 is effected by aid of a motor 40 conveniently attached to the forward right-hand underside of said carrier, for example only, as by a bracket 41 and securing means 41', said motor 40 having a sprocket gear 42, on the shaft 43 thereof, which shaft is, in turn, connected by an endless-drive 44 to a similar gear 45 fast on a horizontal shaft 46, journaled in appropriate bearings 47, similarly attached below the carrier 24 by aid of securing means 48. Spaced pinions 49 fast on the horizontal shaft 46 mesh rack-bars 50 rigidly secured lengthwise of the side structure forward faces 39 aforesaid to effect smooth elevation and descent of the carrier 24, as hereinafter more fully explained.

Conveniently, although not essentially, supported by the right-hand side structure 10 of the warper, as by chocks 51 is a pneumatic check-device 52, for example, the piston rod 53 whereof has fulcrumed thereto at 54, a catch or stop 55 the outer end whereof is inclined at 56 for coaction with the complementally tapered end 57 of a solenoid actuated catch 58, as hereinafter fully explained; whereas an arm 59, of the stop 55, fast to the underside of the carrier 24, is movable with the take-off contact members 60, also secured to said carrier 24, relative to a brush 61 on the confronting side frame 10 of the beamer for purposes later on further amplified.

Referring now to the clamp device 14, which is conveniently mounted by securing means 62 transversely across the warper extension members 37 in advance of the leading accumulator-roll 15, the same includes a stationary anvil 63 and a clamp bar 64, the latter being operable by toggle-links 65, 66 flanking each side of the warper. The respective links 65 are pivoted to the ends of the clamp-bar 64 at 67 and to the links 66 at 68; whereas the links 66 have their lower ends made fast to a transverse shaft 69 journaled in bearings 70 carried by, or formed integral with, the members 37 aforesaid. Keyed or otherwise secured, for example, on the right-hand outer end of the shaft 69 is a sprocket-gear 71, over which is trained an endless-drive 72, in turn coactive with another sprocket-gear 73 fast on the shaft 74 of a motor 75 secured to the adjoining extension member 37 by appropriate means 76, said motor being actuated as hereinafter described.

Having explained the mechanical phases of my present invention I will now proceed to describe the controlling means therefor by reference, more particularly to the electric diagrams illustrated by Figs. 4, 5 and 6. At this juncture it is to be noted, as hereinbefore premised, that a fundamental aim of this invention is to lower the drop-rolls 19—21 consecutively, or one at a time, preferably beginning with the forward roll 19; and permit them to be similarly elevated one at a time commencing with the rear roll 21, and vice versa. In order to fully appreciate the procedure just mentioned and first referring to Fig. 4, which indicates the normal beaming outlay of the electrically activated control system it is to be understood that, when a yarn or thread 13 breaks, the operator will depress the push-button 77 and thereby close a circuit from the middle conductor 78, of the current supply c—s, across the switch element 79 of said push button, through line 80 and coil 81, of the solenoid operating the catch 58; and from said coil to the lower conductor 82, whereby the plunger 57 of said catch 58 is retracted from holding engagement with the stop 55. This release of the parts 55, 57 allows the drop-roll carrier 24 to initially slide slowly downwards from its normal or beaming position of Fig. 2 to that illustrated in Fig. 3 under the cushioning effect of the pneumatic check-device 52. Simultaneously with the just explained circuit-closure a second circuit is completed through the holding coil 83 of a single pole auxiliary switch 84, conveniently located in a switch box 85, see Figs. 1, 2 and 3, which by energizing said coil 83 causes it to bridge the contacts 86; such second circuit, see Fig. 5, being from conductor 78 and branch line 87, across the normally-closed limit switch 88, to and across the contacts 86, branch line 89 and coil 83 to conductor 82; it being noted this second circuit enables the auxiliary switch 84 to remain closed after the operator releases the push button 77.

Simultaneously with the closure of the just described circuits a third one is set up, as follows, to the lower contacts 93 of a single-pole double throw auxiliary switch 90, which is normally in the position of Figs. 4 and 5. This third or shunt circuit is established, as follows, from conductor 78 by branch line 87 and limit-switch 88 to holding coil line 89 and lines 91, 92 across contacts 93 of switch 90 and thence by line 94 to the right-hand coil 95 of a reversing-switch 96 and return by line 97 to conductor 82, with energization of the motor 75 of the yarn or thread clamping-device 14. The motor 75 operates as indicated by the arrow thereon in Fig. 5 to collapse the toggle links 65, 66, which brings the bar 64 down onto the lay of yarns or threads 13, and whereby they are clamped on the anvil 63.

Concurrently with the accomplishment of the yarn or thread clamping action just described, another circuit is established by an extension of the line 92 to the slide contact member 60 and branch-line 98 to the lower left-hand contact 99 of the slidable device or two-circuit switch 61', hereinbefore mentioned as mounted on the drop-roll carrier 24; while said switch 61' is normally in the up position of Figs. 2, 4 and 6. This circuit is also extended by a branch 100, from the line 98, to the left-hand lower contact 101 of a double pole auxiliary switch 102, that is normally open, see Fig. 4; and on from said line 98 to the contacts 103 of a single-pole single-throw switch 106, mounted at the lower end of the runway 25 for the drop-roll 19. The switch 106 is normally open as shown in Fig. 4; as also are corresponding switches 105, 104, respectively at the lower ends of the runways 26 and 27, while opposingly related switches 104', 105' and 106' are provided at the upper ends of said runways 25, 26 and 27, for purposes hereinafter clarified. Attention is here directed to the fact that 19'—21' are gears fast on the axes of the drop-rolls 19—21, for coaction with the respectively associated toothed racks 31; whereas 19''—21'' are outwardly related collars that coact with or ride on the associated guide rail 36 and also actuate the plunger element 115—117 of the switches 104'—106', as later on herein again referred to.

When the carrier 24 approaches the lower limit of its downward travel the plunger 107, see Figs. 2, 3 and 5 to best advantage, of the switch 61' on the said carrier engages the limit stop 38, and closes a branch circuit across the contacts 99, 108 and line 109 from the latter contact 108 to the right-hand side of solenoid operated catches 110, 111, 112, 113 and 114, associated with the several switches 104—106 and 104'—106'. However, since the switches 104' and 105' are open at this time, only the top roll solenoid catch 110 for the forward roll 19 will be operative.

Assuming now that the drop-rolls 19—21 are, at this time, in the normal position for beaming, approximately at the level designated by the arrow a in Fig. 2, or as diagrammatically shown in Fig. 7, with the carrier 24 in its up position and the clamp-bar 64 raised to inactive position; it will be readily understood that, the solenoid-operated catch 110 is in its active position with the switch 104' open, the drop-roll 19, in the runway 25 will be sustained in its upper position by the catch 110 or until said catch is released by the collar 19'' when the drop-roll 19 can descend along the associated rack 34 and guide rail 36 and thereby draw down a loop 13', Fig. 8, of the lay of yarns or threads 13 from off the warper beam—not shown. Now, as the drop-roll 19 approaches the low limit of its travel, it first laterally pushes-in the solenoid catch 112 and then engages with the plunger 115 of the switch 106 to close the latter, which completes a circuit for retraction of the top holding-switch 111 in the intermediate runway 26, with incidental release of the adjoining drop roll 20 for gravitational descent, as set forth in connection with drop roll 19. Similar action will follow as the drop-roll 20 engages the solenoid catch 113 and impacts the plunger 116 of the single-pole switch 105 which, in turn, correspondingly releases the drop-roll 21 for gravitational descent down the runway 27. At this juncture, it is to be particularly noted that while I have disclosed three drop-rolls 19—21, it will be readily understood that any number of additional such rolls may be utilized. Since the carrier 24 is now in its low position, it is observable all three drop-rolls 19—21 will be approximately at the level designated by the arrow c in Fig. 3.

When the last drop-roll 21 approaches its low limit of descent, it impacts the plunger 117 of the single-pole single throw switch 104 and thereby effects completion of a circuit from the branch line 98 through lines 118, 119 to coil 120 of the auxiliary switch 102, and line 121 to top contact 122 of the movable contact member 60'', and bottom contact 123 thereof with line 124 to the supply conductor 82, which causes the switch 102 to complete a circuit across its bottom contacts 101, 101' and thereby effect holding of said switch in the position of Fig. 5 due to energization of the coil 120. A circuit is also thereby established to the carrier-raising motor 40, but since the switches 106', 105 and 106 are all open at this time said motor will not operate. At this time another circuit through the upper contacts 125 of the double-pole double-throw switch 102 to the corresponding contacts 126 of the single-pole double-throw switch 61' is set up, but said switch 61' being now in the low position of Fig. 5 the circuit is not fully completed inasmuch as the slidable contact member 107 of switch 61' is at this time in the low position of Fig. 5.

Now, when the broken yarn or thread 13 has been repaired or knotted and the warper restarted the drop-roll 21 will first be elevated by the tension exerted on the lay of yarns or threads 13 since the runway 27 for said roll has no solenoid catch, equivalent to catches 112, 113 to hold said roll down. The middle and forward drop-rolls 20, 19 respectively do not rise inasmuch as they are held down by the associated solenoid catches 113, and 112; however, when the drop-roll 21 attains the upper limits of its elevation it engages the plunger or catch 114 and thereby closes the double-pole single-throw switch 106'; such closure, in turn, completing a circuit to the solenoid operated catch 113, by way of line 127 Fig. 6 for the middle runway 26 of the drop-roll 20 and thus releasing said roll for elevation, as aforesaid, by the lay of yarns or threads 13. A circuit is, at this time, also established across the left-hand contacts 128 of the switch 106' and line 129 to the corresponding contacts 130 controlling activation of the double-pole single-throw switch 105' governing release of the drop-roll 20, and also advancing the circuit to the elevating motor 40, but not completing said last referred to circuit. The cyclic events just previously explained are repeated in connection with the drop-roll 19 to effect elevation thereof, as aforesaid, by the lay of yarns or threads 13. It is to be noted, however, that as the drop-roll 19 reaches its upward limit of movement said roll effects closure of the single-pole single-throw switch 104' under the action of the associated holding catch 110, and thereby fully completes the circuit for the motor 40 by way of the slidable contact member 60'' and lines 131, 131' to the supply conductor 82, see Fig. 6 to best advantage.

Now it will be readily understood that when the motor 40 is activated the carrier 24, as a unit, will be elevated by the mechanisms 42, 44 and 45 and rack-bars 50. It will, also, be noted that as the carrier 24 commences to rise it will concurrently move the slidable contact member 61' away from the limit stop 38, and thereby enable the switch element bridging the contacts 126 and the contacts 99, 108 to open. Thus it will be observed that when the contacts 126 are open the circuit through all of the solenoid operated catches 110—114 is broken, while the catches 110, 111 and 114 will now operate to hold the drop-rolls 19—21 in their upper position as the carrier 24 continues to ascend and thereby move said drop-rolls up clear of the lay of yarns or threads 13 to approximately the level indicated by the arrow a in Fig. 2.

At the same time when the contacts 126 are bridged by the switch element 107 a circuit is completed through the slidable contact 61' and extension 131 of line 131' to coil 132 of the single-pole double-throw auxiliary switch 90 to supply conductor line 82; and, thereby causing said switch 90 to move from the contacts 93 into engagement with the relatively spaced contacts 133. This actuation of the switch 90 breaks the circuit through the right-hand coil 95 of the reversing-switch 96 and closes another circuit via lines 92 and 134 through the left-hand coil 135, of said switch, and line 97 to conductor 82; which causes the switch 96 to reverse the clamping-motor 75. This reversal of the clamping-motor 75 operates to expand the toggle-links 65, 66 and move the clamp-bar 64 away from the stationary anvil 63 and thereby release, or free, the yarns or threads 13 to the position of Figs. 2 and 7.

As the carrier 24 approaches the limit of its upward travel the stop 55 wipes and passes over the inclined end of the stem 57 of the solenoid-actuated switch 58, Fig. 2, while the upper end 137 of the slidable contact member or device 60 impacts the movable stem 138 of the normally-closed limit-switch 88 to thereby open the circuit from the current supply conductor 78 which permits the solenoid actuated catch 57 to assume its normal position below the stop 55, see Fig. 2. At the same time the circuit to the single pole auxiliary switch 84 is opened; and also the circuit to the carrier raising motor 40 is broken which permits the carrier 24 to slide down into arrestive engagement of the stop 55 against or on the solenoid controlled catch 58, and thereby hold said carrier in the normal position for beaming of the yarns or threads 13, as shown in Figs. 2 and 7. Also broken, at the same time, is the circuit to the reversing switch 96, which thereupon assumes the neutral position of Fig. 4 and de-energizes the clamping motor 75.

Although the raising motor 40 has been shown as attached to the carrier 24 it may, obviously, be mounted on the base of the warper, and the slightly different wiring thereby involved will be readily understood by those conversant with the art without further amplification herein. Furthermore, it is also contemplated, by this disclosure to step the drop-rolls 19—21 so that, when elevating them, each one, in turn, would be carried up clear of the yarns or threads 13 or to the upper limit of its travel by the action of said yarns or threads before the next roll commences ascent. Still further it is to be understood that by the addition of another push or jog-button, in parallel with the switch 104 for the drop-roll 21, to reverse the operation, without the necessity of completing the full cycle of operations; or, more definitely expressed, it will be found advantageous inasmuch as a broken yarn or thread may be discerned before all of the drop-rolls 19—21 are let down.

From the foregoing it will be apparent that by my present improvements the clamping device 14, the carrier 24, as well as the drop-rolls 19—21 are all automatically controlled when the beamer is in operation, whereby detection and repair of a broken yarn or thread is greatly facilitated, with a consequential reduction in overhead and labor costs. It is, furthermore, felt that from the foregoing disclosure the merits and advantages of this invention will be clearly apparent; and while I have shown and described one practical embodiment thereof, it is to be understood that changes and variations, in adapting my invention to different forms of beam warpers, are hereby contemplated, or all such changes as may be fairly included within the terms and scope of the following claims.

Having thus described my invention, I claim:

1. In yarn or thread beam warpers including a common carrier for releasable drop-rolls, and associated means effective to permit retraction of the yarns or threads when necessary; the combination of means for holding the carrier and drop-rolls elevated during the normal beaming operation; means operative to permit gravitational descent of the carrier in opposition to a movement cushioning means until said carrier is retarded by engagement of the drop rolls on the lay of yarns or threads; means for releasing each of the drop rolls individually for further gravitational descent relative to the carrier; means operative to respectively sustain all of the drop rolls elevated within the carrier and to hold down all but one thereof when lowered; and manually operative means effective to release each of the means aforesaid for sequential activation in the desired order whenever a yarn or thread break occurs.

2. In yarn or thread beam warpers including a common carrier for releasable drop-rolls, and associated means effective to permit retraction of the yarns or threads when necessary; the combination of means for holding the carrier and drop-rolls elevated during the normal beaming operation; means operative to permit gravitational descent of the carrier and drop-rolls, in opposition to movement checking means until said carrier is arrested by the drop-rolls engaging on the lay of yarns or threads; means for sustaining the drop-rolls elevated in the carrier until released for consecutive gravitational descent relative to said carrier; means for holding down all but one of the drop-rolls in their lowered location with respect to the carrier, said one roll being free for initial elevation and the others serially releasable for similar movement; and manually shiftable means effective to electrically activate devices whereby each of the means aforesaid are sequentially set in operation whenever a yarn or thread break occurs.

3. In yarn or thread beam warpers including a common carrier for releasable drop-rolls, associated means effective to permit temporary retraction of the yarns or threads whenever necessity so requires, and means for holding the carrier, including front, intermediate and rear drop-rolls, as a unit, elevated during the normal beaming operation; the combination of retractile means coactive with the carrier to permit the latter and the drop-rolls to descend in opposition to movement checking means until said carrier is retarded by said drop-rolls resting on the lay of yarns or threads; retractile means operative to release each individual roll for consecutive gravitational descent relative to the carrier; retractile means for holding all but the trailing one of the drop-rolls in their lowermost location with said trailing one free for initial elevation by the lay of yarns or threads upon rewinding of the latter, and the others consecutively releasable for corresponding elevation; and push-button means effective to electro-magnetically activate devices whereby each of the holding and retractile means aforesaid are sequentially set in operation whenever a yarn or thread break occurs.

4. The invention of claim 3 wherein the means effective to permit temporary retraction of the yarns or threads comprises a clamp-device and an associated electric motor for operating said device; and wherein the drop-roll carrier includes a similar motor for automatically raising said carrier.

5. The invention of claim 3 wherein the means for holding the respective drop-rolls elevated and lowered relative to the carrier consist of opposingly-inward solenoid-influenced catches; and wherein said rolls have terminal means coactive with the free ends of said catches to effect their outward projection as each individual drop-roll approaches the limit of its up and down movement.

6. The invention of claim 3 wherein the carrier and drop-roll movement checking means consists of a pneumatic device of the piston type and the piston whereof has, at its outer end, a stop device supported by the carrier; wherein the carrier sustains a plurality of spaced current conductive bars; and wherein the warper-frame supports a stationary take-off brush device along which the bars aforesaid travel.

7. The invention of claim 3 wherein the carrier embodies opposing channel-section runways having the flange portions inward; wherein the corresponding flange of each runway includes a lengthwise toothed-rack and the opposing flange a guide-rail; wherein each drop-roll end portion is equipped with a gear meshing the associated toothed-rack; and wherein an outwardly-spaced terminal collar on the axis of said roll coacts with the opposing guide-rail.

8. The invention of claim 3 wherein the drop-rolls are released for gravitational descent in consecutive order from the front to the rear of the carrier; and wherein said drop-rolls are elevated in a reverse order of progression by the lay of yarns or threads, incidental to winding up the latter.

9. The invention of claim 3 wherein the carrier runways are provided at their upper and lower ends with single and double-throw switches for impact by terminal collars on the drop-rolls.

JOHN C. BODANSKY.

REFERENCES CITED

The following references are of record in the file of this patent:

UNITED STATES PATENTS

| Number | Name | Date |
| --- | --- | --- |
| 2,302,700 | Lambach | Nov. 24, 1942 |